Sept. 8, 1959  E. D. O'BRIAN ET AL  2,903,365
CONFECTION STRUCTURES
Filed Jan. 22, 1957
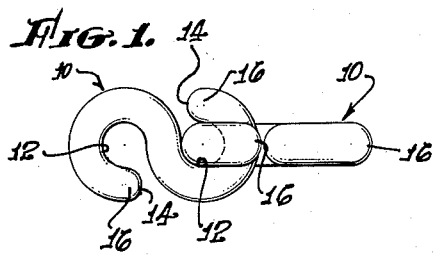
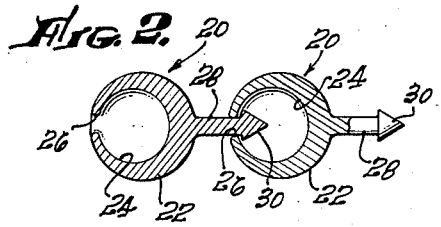
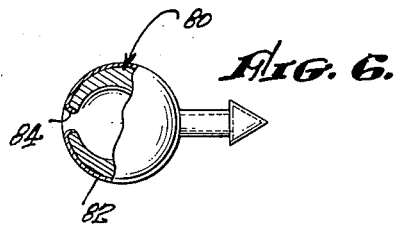
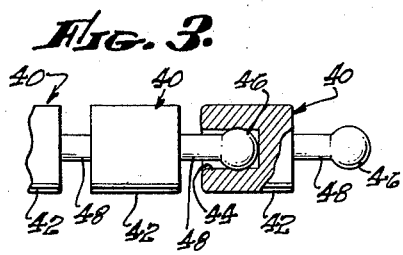
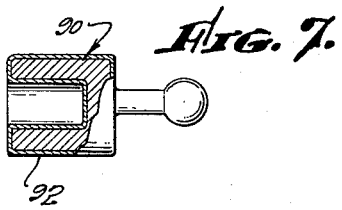
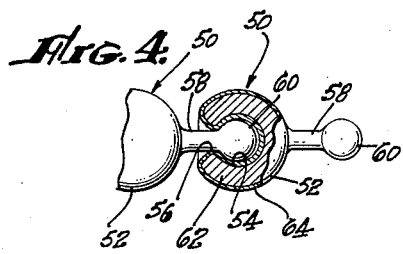
EDWARD D. O'BRIAN,
ROBERT E. O'BRIAN,
INVENTORS.

United States Patent Office 2,903,365
Patented Sept. 8, 1959

2,903,365
CONFECTION STRUCTURES
Edward D. O'Brian, Anaheim, Calif., and
Robert E. O'Brian, Des Moines, Iowa Application January 22, 1957, Serial No. 635,508

13 Claims. (Cl. 99—138)

This invention relates to new and improved confection structures.

Virtually every individual and child at the present time is familiar with the common methods in which gum drops, jelly drops, licorice sticks, chewing gum etc. are manufactured and marketed. The forms and shapes of these products have not changed to any material extent for many years, although the compositions employed in these products have frequently been altered so as to obtain improved textures, keeping properties and the like.

All of the conventional shapes of confection products are considered to have various disadvantages and limitations which are considered to tend to prevent these products from being sold to the maximum possible extent. As an example of this, licorice is conventionally formed into comparatively long sticks of a chewy nature. It is difficult for any child to bite off a portion of such a conventional licorice stick. Further, it is relatively expensive to package individual licorice sticks and the like in other than comparatively long, expensive sacks. Jelly candies of various types suffer from similar limitations and disadvantages inasmuch as they must be separately sacked and sold. A number of attempts have been made to produce whistles, dolls, etc., which are in the nature of toys and which are formed out of edible or at least digestible materials. These efforts have not been extremely successful judging by the quantities of sack products found in the average confectionary store.

One object of this invention is to provide confectionary structures which are in the nature of individual pieces being capable of being fitted together so as to form comparatively long or chain-like strings. It is thought that such chains will have a comparatively large amusement value in addition to the inherent nutritive value of the material of which the individual pieces are formed. Such chains may be composed of individual pieces of different colors and/or confectionary nature. Another object of the invention is to provide confection structures having substantially bite-size parts or pieces which may be readily detached from one another by even the smallest child.

Still further objects and advantages of this invention will be more fully apparent to those skilled in the art to which this invention pertains from a detailed consideration of the remainder of this description, including the appended claims and the accompanying drawing in which:

Fig. 1 is a side elevational view of two confection structures or pieces of this invention assembled together as a part of a chain;

Fig. 2 is a side elevational view, partially in section, of two modified confection structures or pieces of this invention assembled together as a part of a chain;

Fig. 3 is a similar view of a series of further modified confection structures or pieces of this invention assembled together as a part of a chain;

Fig. 4 is another side elevational view, partially in section, of a still further modified confection structure or pieces of this invention assembled as a part of the chain;

Fig. 5 is a side elevational view, partially in section, illustrating how an individual confection structure of piece, such as is shown in Fig. 1, may be protected by a paper coating or package;

Fig. 6 is a side elevational view, partially in section, illustrating how a confection structure or piece such as illustrated in Fig. 2, may be protected by another type of protective coating; and Fig. 7 is a further side elevational view, partially in section, showing a confection structure or piece such as illustrated in Fig. 3 protected by another different type of coating.

In all figures of the drawing, like numerals are used to designate like parts wherever convenient for purposes of explanation and illustration. It is to be understood that the accompanying drawing is not to be taken as limiting this invention in any respect. Obviously the relative sizes and shapes of the various confection structures, or pieces of the invention may be changed within comparatively wide limits without departing from the essential features of the preferred constructions illustrated and described.

It may be stated in essentially summary form that this invention is predicated to a large extent upon the discovery that many types of confectionary compositions possess sufficient resiliency and elasticity so that they may be formed into individual pieces capable of being snapped or popped together into a long chain, or chain-like string. All of such pieces with this invention include what may loosely be termed, male and female attaching members which are adapted to be fitted together so as to form a chain-like composite structure.

It is not considered necessary to set forth in this specification a long list of all of the different types of confectionary compositions which possess a comparatively high degree of resiliency so as to be capable of temporary deformation without breakage. Virtually every individual is familiar with the fact that marshmallows, many types of licorice, many types of jelly confections and many types of chewing gums are of a comparatively resilient category. The compositions of such resilient types of confections may be readily determined by appropriate reference to either the patent literature or to various texts such as the text "Food Products" by Blumenthal, published by Chemical Publishing Company, 1947.

One way in which any of these different types of confection compositions may be formed in individual pieces of this invention is illustrated in Fig. 1 of the drawing. Here there are shown two confection structures or pieces 10 of the invention, each of which has essentially the shape of a common S hook. Each of these pieces 10 thus has two openings or holes 12 and restricted passage-like entrances 14 to each of the holes 12. As illustrated in Fig. 1, the individual pieces 10 may be hooked together by poping one of the ends 16 of one of these pieces 10 through one of the entrances 14 into one of the holes 12, so as to firmly hold several pieces with respect to one another in such a manner that the pieces can be moved easily in the manner in which the links of a chain may be moved. In the embodiment of the invention shown in Fig. 1, the individual pieces 10 may be easily formed of a conventional marshmallow or other compositions by casting or other similar procedures.

In Fig. 2 of the drawing there are shown individual structures or pieces 20 of this invention each of which is formed essentially as a bead so as to each include an enlarged body section 22 which surrounds a central cavity 24 having a restricted opening 26 leading from the exterior of this body section 22 into the cavity 24. A shank 38 extends from each of the body sections 22 and holds a pointed head 30. The heads 30 are, with this embodiment of the invention, adapted to be popped through the openings 26 in adjacent pieces so as to form a chain-like structure. The individual pieces 20 shown in the Fig. 2 may be conveniently formed out of conventional licorice type or other compositions by a variety of procedures. One of these procedures involves essentially forming licorice in a suitable mold. The internal cavity 24 may be readily created in such a mold by using an expandable type of member as part of the mold which is adapted to be contracted after a piece is formed so as to permit withdrawal through the opening 26. Other procedures such as the use of air from a central mandrel can, of course be employed to create a cavity of this nature.

If desired, confectionary structures or pieces 40 such as are illustrated in Fig. 3 of the drawing may be readily created by the same type of casting procedure indicated in the preceding. They, as well as the pieces 20, may also be created from such compositions as conventional chewing gums, containing a high synthetic resin content by appropriate injection molding techniques. Each of the pieces 40 has a body section 42 within which there is formed an internal cylindrical cavity 44 which is adapted to resiliently engage a ball 46 formed at the end of a shank 48 extending from the body section of a next adjacent piece 40. It will be noted that with this construction the walls 46 on the individual pieces 40 may be shoved directly into the cavities 44 described so as to be held by partial deformation of the walls of the body sections surrounding these cavities 44.

A further modified structure of the invention is shown in Fig. 4. This modified structure is composed of individual pieces 50 each of which includes a ball like body section 52 surrounding a corresponding shaped internal cavity 54 which is connected to the outside of each piece 50 by means of an opening 56 having curved walls. From each of the body sections 52 of the piece 50 there extends a shank 58 serving to support an enlarged ball 60 which is adapted to fit within each of the cavities 54.

The individual pieces 50 illustrated in Fig. 4 of the drawings are specifically designed so as to be formed in such a manner as to have a viscous liquid-type center 62 surrounded by an external flexible wall 64. In one preferred type of construction the individual pieces 50 are formed by known techniques so as to have an align content of viscous of jell-like liquid type of center within the body sections 52, the shanks 58 and the balls 60. Each of these pieces is completely surrounded on all exposed surfaces by thin, tough, comparatively insoluble digestible film, such as, for example, a calcium alginate film. Such calcium alginate films may be readily created by dropping preformed pieces 50 at a low enough temperature so that these pieces readily hold their shape into an aqueous bath containing calcium chloride or other similar salts. Similarly, other related plant or artificial hydrocolloids can be utilized in this manner.

In Fig. 5 of the drawing there is illustrated a piece or structure 70 of the invention formed out of the confection so as to have the same S-hook shape as the piece 10. This piece 70 is packaged in a wound or wrapped paper or other similar protective film 72. Such paper or film coatings may be applied to an elongated straight type of confection bar and this bar may then be bent to the shape illustrated during the application of heat, and then allowed to cool in the configuration shown. Such paper or other similar coatings may also be applied to pieces such as the pieces 70 after these pieces have been formed into the shape illustrated.

In Fig. 6 of the drawing there is shown a piece or confection structure 80 of the present invention which has essentially the same shape as individual pieces 20. This piece 80 is surrounded by a protective adherent coating of a non-toxic nature of a wax composition. In one preferred embodiment of this invention, the pieces 80 can be formed out of licorice or the like and then coated with a suitable wax composition which may be broken away from different pieces prior to consumption. A suitable wax for use in this type of application can have any of a wide variety of different ingredients. Rather than set forth in this specification suitable known coating types, reference is made to the text "The Chemistry and Technology of Wax" by Warth, Rheinhold Publishing Company, 1947. A wax composition to be employed in this type of application preferably should have approximately the same temperature coefficient of expansion and contraction as material on which it is placed; also the coating 82 should extend to adjacent opening 84 in the piece 80 so as to be capable of some deformation in forming a seal when individual pieces, such as piece 80, are assembled together in the manner indicated; it should also be capable of some deformation without breakage.

In Fig. 7 of the drawing, there is shown an individual piece or confection structure 90 which is similar in shape to the pieces 40 previously described. In the embodiment shown in this figure the principal portions of such a piece is formed of a common jelly composition such as, for example, is employed for gum drops. Such jellies of a comparatively solid category may be readily coated with a coating 92 of calcium alginate or other similar compositions employing either align or other plant or artificial hydrocolloids by a simple dipping process.

Those skilled in the art to which this invention pertains will realize that substantially all of the different pieces illustrated and described can be formed of any of the different types of confection compositions herein indicated and that practically any of these pieces may be covered by any of the different means illustrated and described in conjunction with Figs. 5, 6 and 7. Other covering means such as conventional sacks or the like can also be employed. They will further realize that the individual pieces may be separately colored or flavored in any desired manner, and the chain-like structures of similarly formed pieces of different types of confection compositions which, if desired, may have separate colors and flavors, may be popped together. Because of the fact that this invention is capable of a great deal of modification and adaptation, it is to be considered as being limited only by the appended claims.

We claim:

1. A confection structure of the class described which comprises: a plurality of individual pieces, each of said pieces being formed of a confection composition of a resilient and elastic character, each of said pieces including male and female attaching means capable of temporary deformation whereby said pieces are capable of being popped together with the male attaching means on one of said pieces engaging said attaching female means on the next adjacent of said pieces, said pieces being interconnected to one another in a chain-like structure.

2. A confection structure as defined in claim 1 wherein said individual pieces are each covered with a protective coating.

3. A confection structure as defined in claim 1 wherein each of said individual pieces is covered with an adherent wax composition capable of being broken so as to be removed from each of said pieces prior to the consumption of the same.

4. A confection structure as defined in claim 1 wherein each of said pieces is covered with an adherent protective digestible film-like coating.

5. A confection piece of the class described formed of a confection composition of a resilient and elastic character capable of undergoing temporary deformation, said piece shaped so as to have an S-hook shape.

6. A confection piece of the class described formed of a confection composition of a resilient and elastic character capable of undergoing temporary deformation, said piece being formed so as to have a body section with a cavity formed therein, an entrance leading from the interior of said body section into said cavity, a shank extending from said body section and a head located upon said shank so as to be positioned away from said body section, said head being capable of being popped through the entrance of an adjacent piece of substantially identical configuration so as to secure said pieces to one another.

7. A confection piece as defined in claim 6 wherein said cavity is of a cylindrical shape.

8. A confection piece as defined in claim 6 wherein said cavity is of a spherical shape and wherein said entrance is of a smaller diameter than said cavity.

9. A confection piece as defined in claim 6 wherein said piece is covered with an adherent protective digestible coating and wherein said piece is of a solid character.

10. A confection piece as defined in claim 6 wherein said piece is covered with an adherent protective digestible film, and wherein said piece is formed of a viscous liquid type of composition.

11. A confection piece as defined in claim 6 wherein said piece is covered with an adherent wax composition.

12. A chain-like confection structure composed of a plurality of individual pieces, said pieces differing from one another as to composition, each of said pieces being formed of a confection composition of a resilient and elastic character so as to be capable of temporary deformation so as to include male and female attaching means, said male attaching means on any one of said pieces engaging said female attaching means on the next adjacent one of said pieces.

13. A chain-like confection structure as defined in claim 12 wherein each of said pieces is covered with a protective coating.

References Cited in the file of this patent

UNITED STATES PATENTS

| | | |
|---|---|---|
| 166,365 | Hawker | Aug. 3, 1875 |
| 168,488 | Hawker | Oct. 5, 1875 |

FOREIGN PATENTS

| | | |
|---|---|---|
| 6,972 | Great Britain | 1885 |
| 8,648 | Switzerland | Oct. 8, 1894 |
| 261,438 | Italy | Nov. 27, 1928 |